(12) United States Patent
Schmauder

(10) Patent No.: US 7,316,639 B2
(45) Date of Patent: Jan. 8, 2008

(54) TOOL MAGAZINE

(75) Inventor: Horst Schmauder, Metzingen (DE)

(73) Assignee: Huller Hille, GmbH (DE)

( * ) Notice: Subject to any disclaimer, the term of this patent is extended or adjusted under 35 U.S.C. 154(b) by 0 days.

(21) Appl. No.: 11/652,967

(22) Filed: Jan. 12, 2007

(65) Prior Publication Data

US 2007/0167303 A1 Jul. 19, 2007

(30) Foreign Application Priority Data

Jan. 18, 2006 (EP) .................................. 06000973

(51) Int. Cl.
*B23Q 3/157* (2006.01)

(52) U.S. Cl. ........................... 483/61; 483/62; 483/67; 483/49; 483/51

(58) Field of Classification Search ................ 483/38, 483/39, 49, 51, 58, 60, 61, 62, 63, 64, 66, 483/67, 901

See application file for complete search history.

(56) References Cited

U.S. PATENT DOCUMENTS

| | | | | |
|---|---|---|---|---|
| 4,087,901 A | * | 5/1978 | Lohneis et al. ............... | 483/61 |
| 4,119,213 A | | 10/1978 | Sato et al. | |
| 5,281,194 A | * | 1/1994 | Schneider ................... | 483/901 |
| 5,702,336 A | * | 12/1997 | Kameyama ................... | 483/56 |
| 6,071,220 A | * | 6/2000 | Sugihara et al. .............. | 483/41 |
| 6,077,206 A | | 6/2000 | Azema | |
| 6,325,748 B1 | * | 12/2001 | Watanabe et al. ............. | 483/62 |
| 6,464,623 B1 | * | 10/2002 | Laur et al. .................... | 483/41 |
| 6,579,216 B2 | * | 6/2003 | Germerodt et al. ........... | 483/51 |
| 6,641,511 B2 | * | 11/2003 | Patel et al. ................... | 483/49 |
| 6,685,608 B2 | * | 2/2004 | Menzio ........................ | 483/51 |
| 6,814,692 B2 | * | 11/2004 | Mattes et al. ................. | 483/49 |
| 7,048,679 B2 | * | 5/2006 | Hagmann et al. ............. | 483/39 |
| 7,153,252 B2 | * | 12/2006 | Luscher ....................... | 483/62 |
| 7,250,024 B2 | * | 7/2007 | Geissler et al. ............... | 483/49 |

FOREIGN PATENT DOCUMENTS

DE 4015460 11/1991

* cited by examiner

*Primary Examiner*—Dana Ross
(74) *Attorney, Agent, or Firm*—Reising, Ethington, Barnes, Kisselle, P.C.

(57) ABSTRACT

A tool magazine exhibits a storage wheel, on the circumference of which there are attached, in the direction of its rotational axis protruding in both directions, tool receivers designed to receive tools. To transport the tools to a tool changer arranged on one side of the storage wheel there is provided a tool handover device, which is movable by means of a 4-position drive. To also enable the tools arranged to face away from the tool changer to be transported, the storage wheel exhibits passage opening that is open towards its circumference.

8 Claims, 4 Drawing Sheets

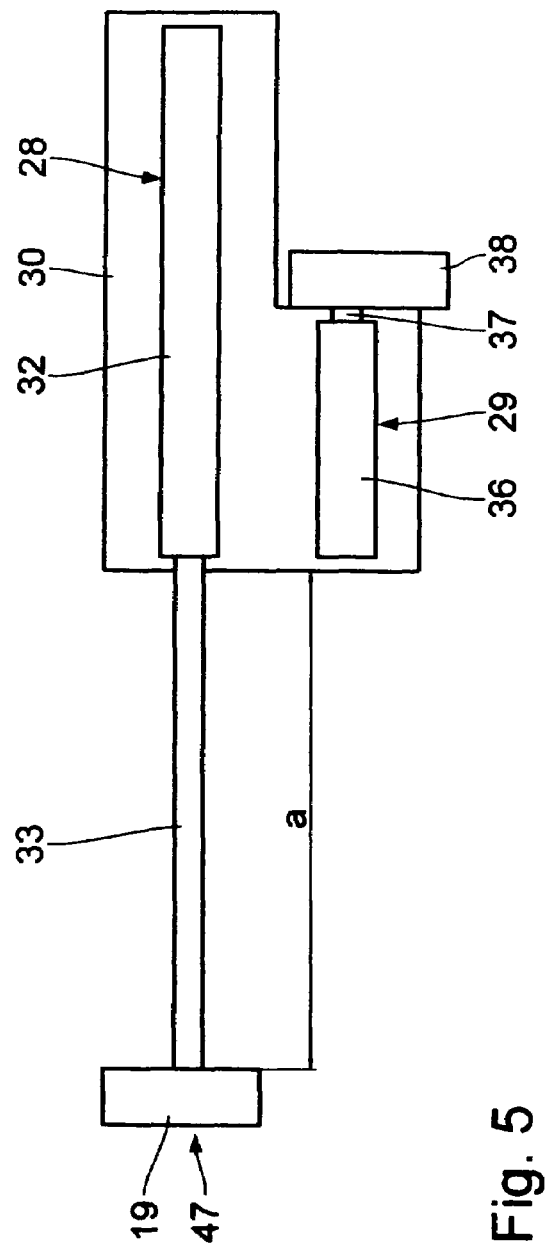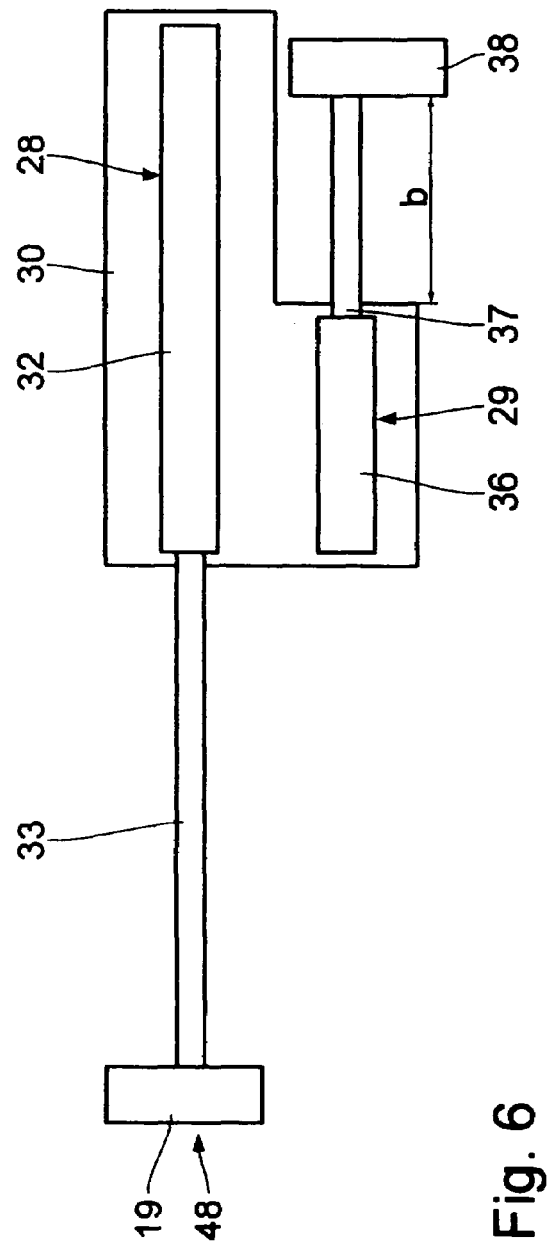
Fig. 5
Fig. 6

TOOL MAGAZINE

BACKGROUND OF THE INVENTION

1. Field of the Invention

The invention relates to a tool magazine having a storage wheel that is arranged around its rotational axis to be rotatably drivable and that is fitted with tool receivers in the area of its circumference.

2. Background Art

On such a tool magazine known from U.S. Pat. No. 6,077,206 the individual tools are held on the circumference of the storage wheel in such a way that their longitudinal axes are arranged parallel to the rotational axis of the storage wheel. The removal and the placing of a tool takes place directly via the chuck mounted on the spindle of the machine tool, with the transportation of the spindle with the chuck occurring via the usual cross slide of the machine tool. This is possible because the holding elements of the tools protrude beyond the storage wheel in the direction of the rotational axis and can thus be approached directly with the chuck of the spindle of the machine tool. To receive a single and/or a few especially voluminous tools there is provided in the circumference of the storage wheel a larger recess, in which such particularly large tools can be accommodated so that the total circumference of the storage wheel fitted with tools does not become too large. The recess serves to save space. The storage volume of said known storage wheel is limited.

Moreover there are known tool magazines designed as a kind of shelf, in which tools are stored. The transportation of tools from a machine tool to said shelf or vice versa occurs by means of tool changers exhibiting appropriate grippers.

SUMMARY OF THE INVENTION

It is an object of the invention to create a tool magazine of the generic kind such that the storage volume becomes as large as possible, and which has a correspondingly low space requirement.

Said object is achieved by a tool magazine having a storage wheel, that is arranged around its rotational axis to be rotatably drivable, that is fitted, on its circumference, with a first row and a second row of tool receivers, arranged opposite to each other in the direction of rotational axis an that exhibits on its circumference a passage opening, having a tool changer, that exhibits at least one tool gripper and that is arranged on a storage wheel side facing the first row of tool receivers and having a tool handover device, that exhibits a transport slide that is movable in parallel to the rotational axis, that exhibits a tool clamping device which faces the storage wheel and which is arranged on the transport slide and that exhibits a 4-position drive to move the transport slide between four positions, of which a first position is at the tool changer, a second position is in front of the first row of tool receivers, a third position is in front of the second row of tool receivers and a fourth position is on a side of the third position facing away from the tool changer. Through the solution according to the present invention it is achieved that both face sides of the storage wheel are fitted with tool receivers in the circumferential area and can thus be taken advantage of for the storage of tools. By means of the tool handover device it is possible to transport tools from both face sides of the storage wheel to the tool changer or, vice versa, from the tool changer to the storage wheel, and insert them therein.

If according to an advantageous embodiment of the invention the tool receivers are designed for the receipt of a tool in such a way that a holding section of the tool is located on a radially outward side of the storage wheel, and that a working section is facing the rotational axis it is achieved that the heavy parts of a tool are affixed to the storage wheel as closely as possible to the rotational axis thereof so that the inertia of the storage wheel—for a predetermined number of tool receivers—becomes as low as possible. The central longitudinal axes of the tools, around which they are rotatably driven on the machine tool, thus run radially to the rotational axis of the storage wheel.

Further advantages, features and details of the invention result from the following description of an embodiment example with reference to the drawing.

DESCRIPTION OF THE PREFERRED EMBODIMENT

Figure 1:
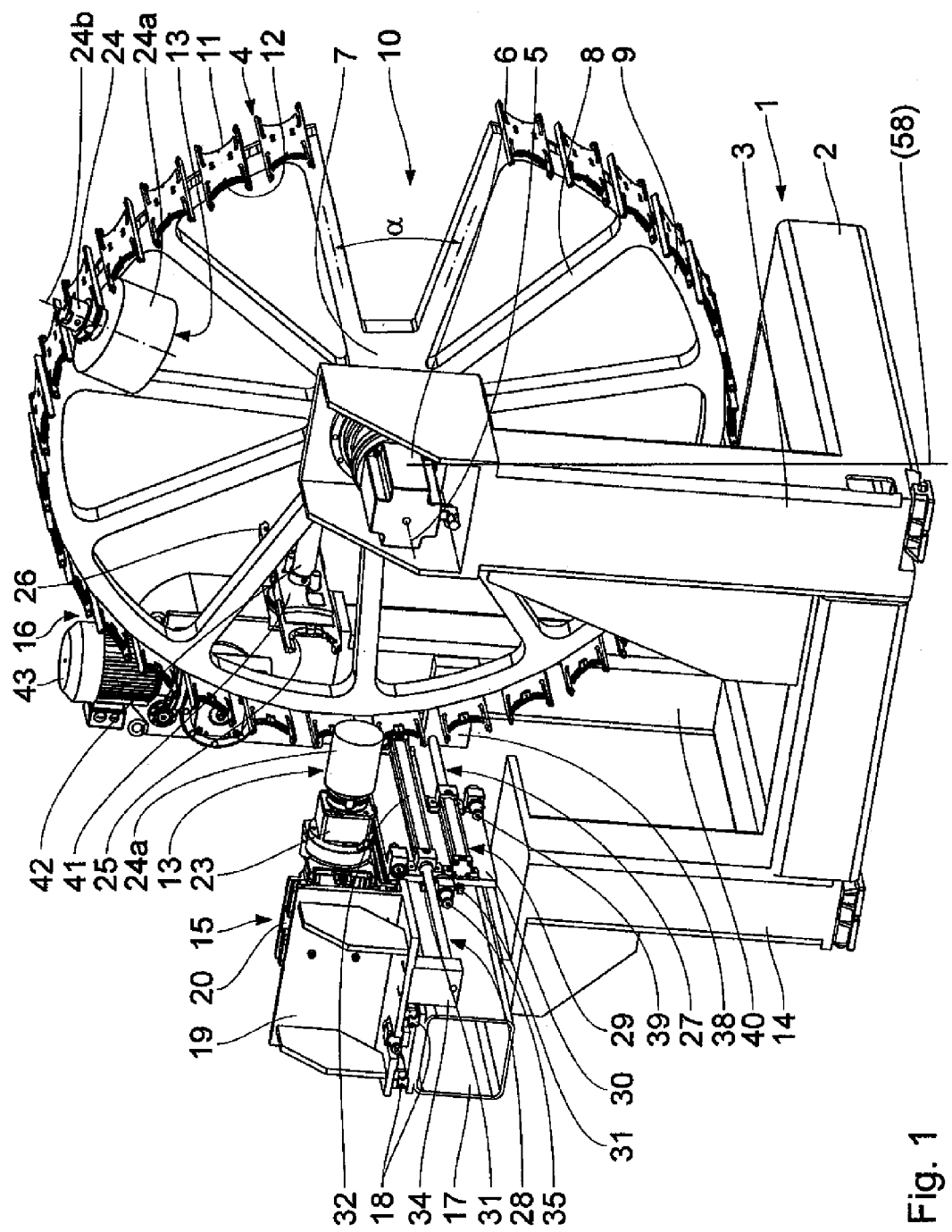
FIG. 1 shows a perspective representation of a tool magazine according to the invention.
Figure 2:
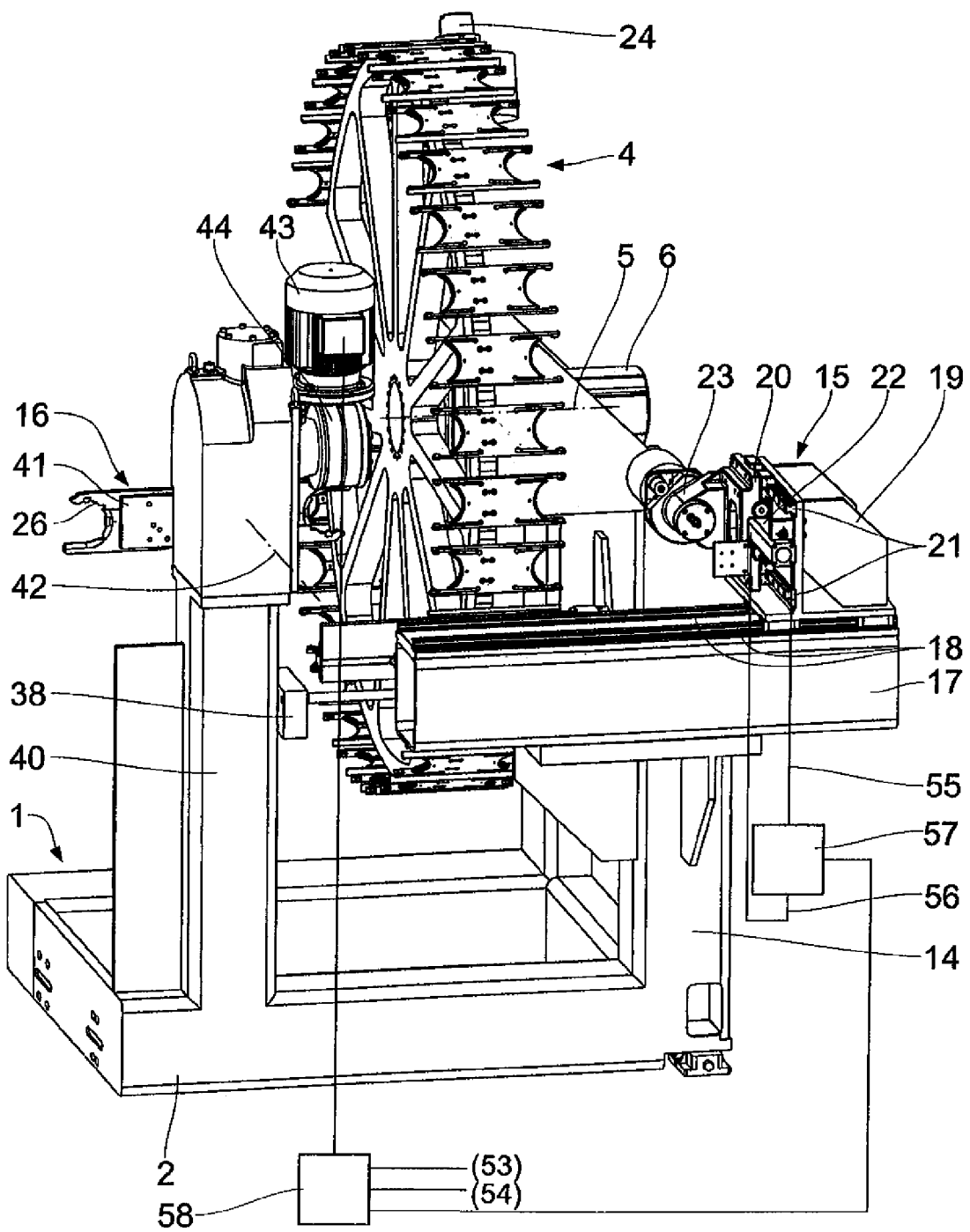
FIG. 2 shows another perspective representation of the tool magazine from a viewing direction essentially opposite to the viewing direction according to FIG. 1, FIGS. 3 to 6 show four positions of a transport slide with a tool clamping device of the tool magazine according to the invention in a schematic representation.

The tool magazine shown in FIGS. 1 and 2 exhibits a rack 1, which is supportable on the ground via a bottom base frame 2. On said base frame 2 there is mounted a column 3, at the top end of which there is a storage wheel 4 rotatably disposed in a bearing around a horizontal rotational axis 5. A rotary actuation of said storage wheel 4 occurs by means of an electric motor 6 also mounted on the column 3. The storage wheel 4 exhibits spokes 8 attached to a central hub 7 and running radially outward relative to the rotational axis 5, said spokes in turn carrying an external rim 9 having the shape of a partial circle. Said rim 9 is interrupted between two neighbouring spokes 8, so that in this area—shown in FIG. 1 on the right—the storage wheel 4 is open toward the outside, thus exhibiting passage opening 10. In the present embodiment said passage opening 10 extends, for example, over a circumferential angle α of 30°.

On the rim 9 there are arranged, over its entire extent, two rows of tool receivers 11, 12, into which may be inserted, or from which may be removed, tools 13 to be employed on machine tools. Tool receivers 11 and 12 of this kind, springily holding the tools 13 are generally known in practice. As can be seen from FIGS. 1 and 2, the rows of tool receivers 11, 12 are mounted—seen in the direction of the rotational axis 5—on both sides of the rim 9, i.e. the first row of tool receivers 11 on what is in FIG. 1 the rear side of the rim 9, and the second row of tool receivers 12 on the front side of the rim 9. The tool receivers 11, 12 protrude in the direction of the rotational axis 5 in each case beyond the rim 9, so that they are freely accessible in the direction of the rotational axis 5. The tool receivers 11 and the tool receivers 12 are distanced from each other in the circumferential direction of the rim 9 such that tools 13 can be received in two tool receivers 11 and 12 adjacent to each other in the direction of the rotational axis 5; yet, their distance is so small that no space is wasted. As can be seen from FIG. 1, the tools 13 are held radially to the axis 5 in the receivers 11, 12.

On the base frame 2 there is furthermore provided a support column 14 for a tool handover device 15. By means of said handover device 15, tools 13 are taken from out of the storage wheel 4 and transported to a tool changer 16, or taken from out of tool changer 16 and transported to the storage wheel 4, and handed over to the latter.

The tool handover device 15 exhibits a horizontal beam 17, on which there are mounted, in parallel to the rotational axis 5, guide rails 18 on which a transport slide 19 is slidably arranged. On said transport slide 19 another tool-holding slide 20 is arranged perpendicularly to the rotational axis 5 and is horizontally slidable on guide rails 21. Said holding slide 20 is drivable by means of a 2-position drive 22, designed as a simple pneumatically actuatable piston/cylinder drive. On the tool-holding slide 20 there is arranged a tool clamping device 23, with which the holding cone 24 of a tool 13 can be tightened in a customary way and the tool 13 thus be retained. The drive 22 serves to push the tool clamping device 23 over the holding cone 24, facing towards it, of a tool 13, which is located either in one of the receivers 11 or 12 of the storage wheel 4 or in a gripper 25 or 26 of the tool changer 16. The drive 22 thus only serves to push the tool clamping device 23 over such a holding cone 24, or to remove it therefrom.

The transport slide 19 is moved between four positions by means of a 4-position drive 27. To this end said drive 27 exhibits two 2-position drives 28, 29, which are formed by pneumatically actuatable piston/cylinder drives, and a drive slide 30. Said drive slide 30, which essentially consists of a plate, is slidably arranged on guide rails 31 which are arranged horizontally and parallel to the rotational axis 5. The guide rails 31 are located on the side, which is visible in FIG. 1, of the beam 17 below the transport slide 19. The top 2-position drive 28 in FIG. 1 exhibits a cylinder 32 affixed to the drive slide 30. Moreover, it exhibits a piston rod 33 connected to the bottom counter bearing 34 of the transport slide 19. Assigned to said counter bearing 34 there is formed on the drive slide 30 a stop 35, against which said counter bearing 34 abuts when the piston rod 33 is retracted inside the cylinder 32, whereby there is defined a position of the transport slide 19 relative to the drive slide 30.

Below the first 2-position drive 28 there is mounted the second 2-position drive 29 whose cylinder 36 is also affixed to the drive slide 30. Its piston rod 37 is affixed to a stationary counter bearing 38, which is mounted on another changer column 40 still to be made reference to hereinbelow. On the drive slide 30 there is mounted another stop 39, which abuts the counter bearing 38 when the piston rod 37 is retracted inside the cylinder 36, thus defining the position of the drive slide relative to the beam 17 and hence to the tool changer 16 when the piston rod 37 is retracted.

The tool changer 16 exhibits the aforementioned changer column 40, which is mounted on the base frame 2, and on which there are arranged the two grippers 25, 26 formed on a common changer arm 41. The changer arm 41 with the grippers 25, 26 is rotationally drivable, namely by means of a swing motor 43 via a gearbox 44, around a horizontal swing axis 42 running perpendicularly to the rotational axis 5. The changer arm 41 can in each case be swung by 180°, the two grippers 25, 26 being positioned in a horizontal plane situated in the travel plane of the tool clamping device 23. Such grippers 25, 26, including their attachment to an arm 41, are generally known and customary in practice.

The functioning is explained on the basis of FIGS. 3 to 6.

Figure 3:
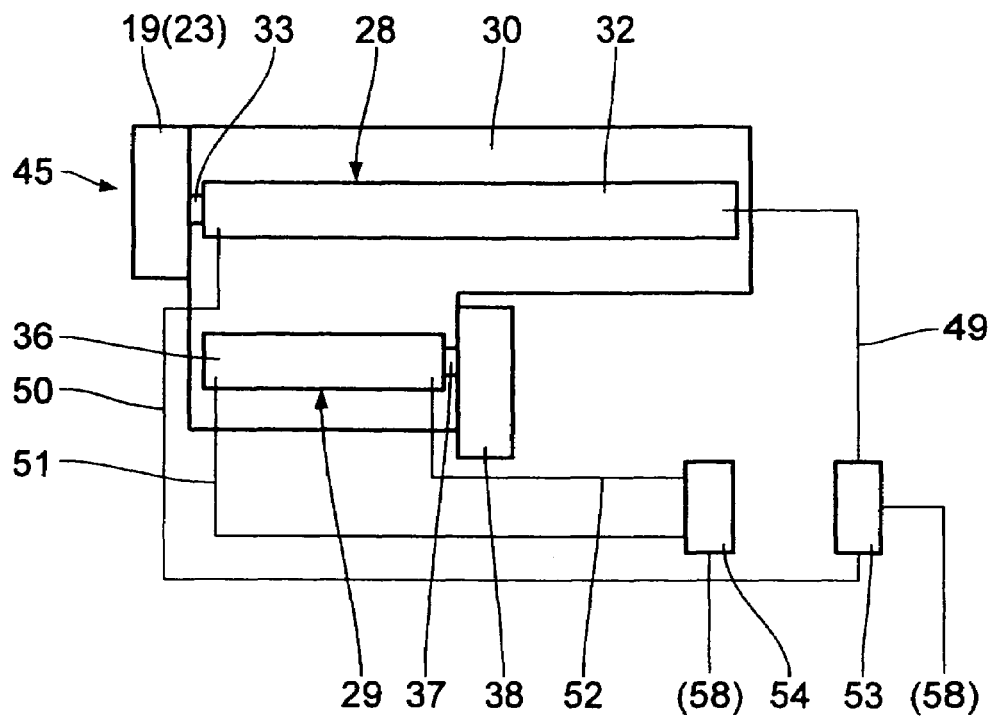

According to the representation in FIG. 3 both drives 28, 29 are retracted, i.e. the piston rods 33, 37 are retracted into the cylinder 32, 36. The drive slide 30 and the transport slide 19 are in their closest neighbouring position to the tool changer 16. The tool clamping device 23 is in a first position 45, in which it overlaps with the gripper 25 facing storage wheel 4. In this first position 45 a tool 13 can be either handed over from the tool clamping device 23 to a gripper 25 or 26, or be removed therefrom.

Figure 4:
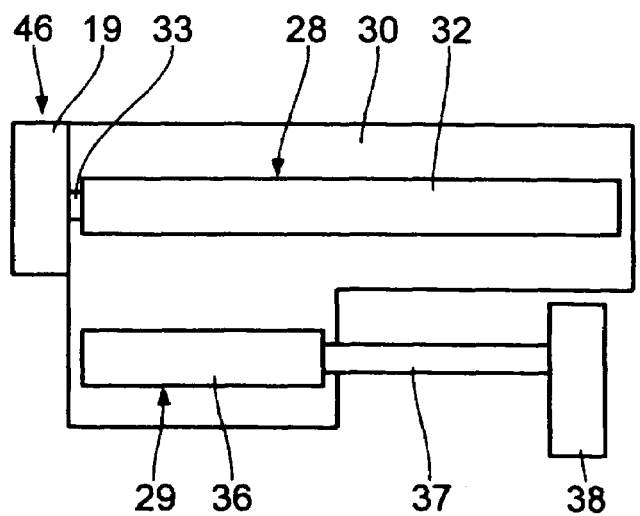

According to the presentation in FIG. 4 the 2-position drive 28 continues to be retracted, but the piston rod 37 is extended from the cylinder 36 of the 2-position drive 29. In this second position 46 of tool clamping device 23 it overlaps with a tool receiver 11 of the storage wheel 24 and inserts a tool 13 therein, or removes a tool 13 therefrom.

In the position shown in FIG. 5 the piston rod 37 of the drive 29 is again retracted into the cylinder 36 of the drive 29. The piston rod 33, however, extends from the cylinder 32. Since stroke a of the 2-position drive 28 is larger than stroke b of the 2-position drive 29, the tool clamping device 23 is in a third position 47, which is further away from the tool changer 16 than the second position 46. As can be seen from the drawing, the drive slide 30 here is again in the same position as that according to FIG. 3. In this third position 47 the tool clamping device 23 overlaps with a tool receiver 12 and can in this position in such a tool receiver 12 dispense or receive a tool 13 there.

In the position according to FIG. 6, both drives 28, 29 are extended, i.e. the tool clamping device 23 is in a fourth position 48, in which, on the side of the storage wheel 4 facing away from the tool changer 16, it is also totally free from the assigned tool receivers 12. Both piston rods 33, 37 are extended. The drive slide 30 is in the same position as in FIG. 4.

The tool change now takes place as follows:

In the tool clamping device 23 there is a tool 13 that is to be brought to the tool changer 16. To this end the transport slide 19 with the tool clamping device 23 and the tool 13 is moved into the first position 45, whereby it is inserted into the gripper 25. The tool clamping device 23 is loosened and the tool-holding slide 20, though appropriate actuation of the drive 22, is moved such that the tool clamping device 23 is pulled from the holding cone 24 of the tool 13 located in the gripper 25. Thereafter, the changer arm 41 is turned by 180° so that a tool 13 located in the gripper 26, in turn, arrives in front of the tool clamping device 23. Said tool is one that has been removed from the neighbouring machine tool, which is not shown, in order to exchange it with the last-mentioned tool 13 conveyed in the tool changer 16. The drive 22 is operated in the opposite direction so that the tool clamping device 23 is pushed onto the holding cone 24 of the last-mentioned tool 13. If said tool 13 newly received by the clamping device 23 is now to be placed or put down in a tool receiver 11 facing the tool changer 16, then the transport slide 19 is moved into the position shown in FIG. 4, in which the tool 13 is inserted into a tool receiver 11 of the storage wheel 4. The release of the tool 13 placed in the tool receiver 11 occurs in the described way by loosening and moving the tool clamping device 23 by means of the drive 22.

If, however, the tool 13 to be put down is to be put down in a tool receiver 12, located on the storage wheel 4 side facing away from the tool changer 16, then the storage wheel 4 has to be in a position in which the opening 10 is in the movement track of the tool clamping device 23 with a tool 13, so that the transport slide 19 can be moved into the forth position 48 of the tool clamping device 23, as shown in FIG. 6. During this, the tool held by the tool clamping device 23 is guided through the free space formed by the passage opening 10. When the tool clamping device 23 is in the fourth position 48 shown in FIG. 6, the storage wheel 4 is turned such that the tool receiver 12 receiving the tool 13 is positioned in the movement track of the tool clamping devices 23 with the tool 13. Now, the transport slide 19 is moved into the third position 47 of the tool clamping device 23 as shown in FIG. 5, whereby the tool 13 held by it is inserted into desired tool receiver 12. The loosening of the tool clamping device 23 from the holding cone 24 of said tool then again occurs in the manner described. The removal of a tool 13 from a tool receiver 11 occurs in the opposite sequence. During the motion sequences described, the working head 24a of the tool 13 is always positioned radially inside the storage wheel 4, in other words it faces the rotational axis 5; its central longitudinal axis 24b extends radially relative to the rotational axis 5.

The supply of compressed air to the drives 28 and 29 is via compressed air lines 49, 50 and 51, 52, which, each for one drive 28, 29, are pressurised and vented via a solenoid valve 53, 54. In the same way, the drive 22 is pressurised with compressed air, and vented, via compressed air lines 55, 56, for which there is provided a solenoid valve 57. Die solenoid valves 53, 54 and 57 and the motors 6 and 43 are controlled from a central control system 58. This also applies to the actuation, which is not shown, of the tool clamping device 23 during the clamping and loosening of a holding cone 24 of a tool 23.

Instead of the fluidically actuated piston/cylinder drives 28, 29, the driving of the transport slide 19 can also occur by means of a servo motor via a spindle drive, the servo motor being controlled by the central control system 58 to move into the mentioned positions 45, 46, 47, 48.

What is claimed is:
1. Tool magazine
having a storage wheel,
  that is arranged around its rotational axis to be rotatably drivable,
  that is fitted, on its circumference, with a first row and a second row of tool receivers, arranged opposite to each other in the direction of rotational axis and
  that exhibits on its circumference a passage opening,
having a tool changer,
  that exhibits at least one tool gripper and
  that is arranged on a storage wheel side facing the first row of tool receivers and
having a tool handover device,
  that exhibits a transport slide that is movable in parallel to the rotational axis,
  that exhibits a tool clamping device which faces the storage wheel and which is arranged on the transport slide and
  that exhibits a 4-position drive to move the transport slide between four positions, of which
    a first position is at the tool changer,
    a second position is in front of the first row of tool receivers,
    a third position is in front of the second row of tool receivers and
    a fourth position is on a side of the third position facing away from the tool changer.
2. Tool magazine according to claim 1, wherein
the tool receivers are designed for the receipt of a tool in such a way that a holding section of the tool is located on a radially outward side of the storage wheel, and that a working section is facing the rotational axis.
3. Tool magazine according to claim 2, wherein
the tool clamping device is arranged on a tool-holding slide that is movable radially to the rotational axis.
4. Tool magazine according to claim 1, wherein
the 4-position drive is formed by two 2-position drives.
5. Tool magazine according to claim 4, wherein
the 2-position drives are formed by fluidically actuatable piston-cylinder drives.
6. Tool magazine according to claim 5, wherein
there is provided a drive slide, which is slidably guided parallel to the transport slide and to which there is affixed, in each case, a first end of the first and the second 2-position drive and
a second end of the first 2-position drive is attached to the transport slide and
a second end of the second 2-position drive is stationarily affixed.
7. Tool magazine according to claim 5, wherein
the first 2-position drive exhibits a stroke a and the second 2-position drive exhibits a stroke b and
that the following applies: a>b.
8. Tool magazine according of claim 1, wherein
the tool changer exhibits two grippers which are alternately movable to overlap with the tool clamping device.

* * * * *